US011552589B2

United States Patent
Wang

(10) Patent No.: US 11,552,589 B2
(45) Date of Patent: Jan. 10, 2023

(54) DISSIPATION CIRCUIT FOR ELECTRIC VEHICLES

(71) Applicant: FORD GLOBAL TECHNOLOGIES, LLC, Dearborn, MI (US)

(72) Inventor: Miao Wang, Columbus, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/709,696

(22) Filed: Dec. 10, 2019

(65) Prior Publication Data

US 2021/0175837 A1    Jun. 10, 2021

(51) Int. Cl.
*H02P 29/032* (2016.01)
*H02P 27/06* (2006.01)
*B60L 3/00* (2019.01)

(52) U.S. Cl.
CPC ............ *H02P 29/032* (2016.02); *B60L 3/003* (2013.01); *H02P 27/06* (2013.01)

(58) Field of Classification Search
CPC ......... H02P 29/032; H02P 27/06; B60L 3/003
See application file for complete search history.

(56) References Cited

U.S. PATENT DOCUMENTS

| 5,523,665 | A | 6/1996 | Deaver | |
|---|---|---|---|---|
| 2017/0355267 | A1* | 12/2017 | Zhou | H02M 1/32 |
| 2018/0281600 | A1* | 10/2018 | Zhou | B60L 53/14 |

FOREIGN PATENT DOCUMENTS

| CN | 102739144 A | 10/2012 |
|---|---|---|
| CN | 103187760 A | 7/2013 |
| CN | 107487190 A | 12/2017 |

OTHER PUBLICATIONS

"Fundamentals of Electronic Circuit Design" David J. Comer and Donald T. Comer; 1st edition; Published by Wiley; May 21, 2002; p. 179, Figure 6.10; (Year: 2002).*

* cited by examiner

*Primary Examiner* — Eduardo Colon Santana
*Assistant Examiner* — Bradley R Brown
(74) *Attorney, Agent, or Firm* — David B Kelley; Brooks Kushman P.C.

(57) ABSTRACT

A method for dissipating power of an automotive electric drive system that includes a traction battery, and an inverter, wherein the inverter includes a DC bus between, and a dissipation circuit between the traction battery and DC bus, wherein the dissipation circuit includes a plurality of resistors connected in series between positive and negative terminals of the DC bus and a dissipation resistor and switch connected in series between the positive and negative terminals, the method includes responsive to a voltage across one of the plurality of resistors being less than a threshold value, deactivating the switch to prevent current flow from the positive terminal to the negative terminal through the dissipation resistor, and responsive to the voltage exceeding the threshold value, activating the switch to permit current flow from the positive terminal to the negative terminal through the dissipation resistor.

10 Claims, 3 Drawing Sheets

DISSIPATION CIRCUIT FOR ELECTRIC VEHICLES

TECHNICAL FIELD

The present disclosure generally relates to a bleeding circuit for bleeding/dissipating a high-voltage bus of an electrified vehicle.

BACKGROUND

Electric vehicles (EVs) and hybrid electric vehicles (HEVs) often use regenerative mode (re-gen mode) to convert a kinetic energy into electric energy to charge a traction battery. For instance, electric power generated by an electric motor flows from the motor to the battery through an inverter in the re-gen mode. However, a "load dump" condition may occur in the regenerative mode when a main contactor for the traction battery is open, separating the battery from the high voltage bus. Under such condition, since the battery is disconnected from the inverter, the power generated may be "dumped" in to a DC capacitor connected with the high-voltage bus.

SUMMARY

In one or more illustrative embodiments of the present disclosure, a vehicle includes an electric drive system including a traction battery and an inverter, wherein the inverter includes a DC bus, and a dissipation circuit between the traction battery and DC bus, wherein the dissipation circuit includes discharge and sensing resistors connected in series between positive and negative terminals of the DC bus and a dissipation resistor and switch connected in series between the positive and negative terminals, wherein the discharge resistor, sensing resistor, and gate of the switch share a common terminal, and wherein the switch is configured such that responsive to a voltage across the sensing resistor being less than a threshold value, the switch remains off to prevent current flow from the positive terminal to the negative terminal through the dissipation resistor, and responsive to the voltage exceeding the threshold value, the switch turns on to permit current flow from the positive terminal to the negative terminal through the dissipation resistor.

In one or more illustrative embodiments of the present disclosure, a method for dissipating power of an automotive electric drive system that includes a traction battery, and an inverter including a DC bus and a dissipation circuit between the traction battery and DC bus, wherein the dissipation circuit includes a plurality of resistors connected in series between positive and negative terminals of the DC bus and a dissipation resistor and switch connected in series between the positive and negative terminals, the method includes responsive to a voltage across one of the plurality of resistors being less than a threshold value, deactivating the switch to prevent current flow from the positive terminal to the negative terminal through the dissipation resistor, and responsive to the voltage exceeding the threshold value, activating the switch to permit current flow from the positive terminal to the negative terminal through the dissipation resistor.

In one or more illustrative embodiments of the present disclosure, an automotive electric drive system includes a traction battery; an inverter; a DC bus between the traction battery and inverter; and a dissipation circuit, between the traction battery and DC bus, including one or more Zener diodes, a limiting resistor, and sensing resistor connected in series between positive and negative terminals of the DC bus and a dissipation resistor and switch connected in series between the positive and negative terminals, wherein the limiting resistor, sensing resistor, and gate of the switch share a common terminal, and wherein the switch is configured such that responsive to a voltage across the sensing resistor being less than a threshold value, the switch remains off to prevent current flow from the positive terminal to the negative terminal through the dissipation resistor, and responsive to the voltage exceeding the threshold value, the switch turns on to permit current flow from the positive terminal to the negative terminal through the dissipation resistor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
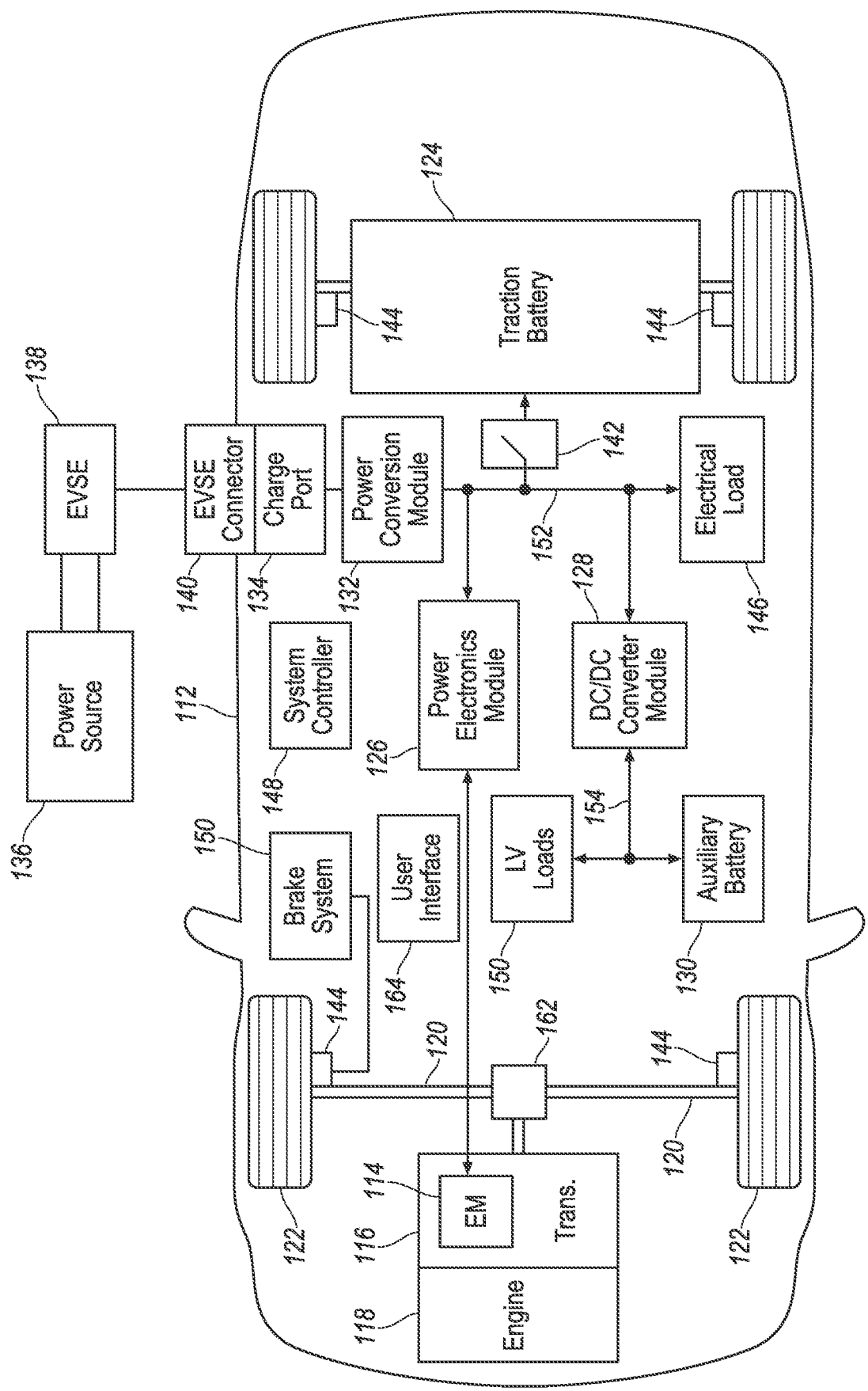
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (may also be referred to as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for braking the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for slowing the vehicle. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
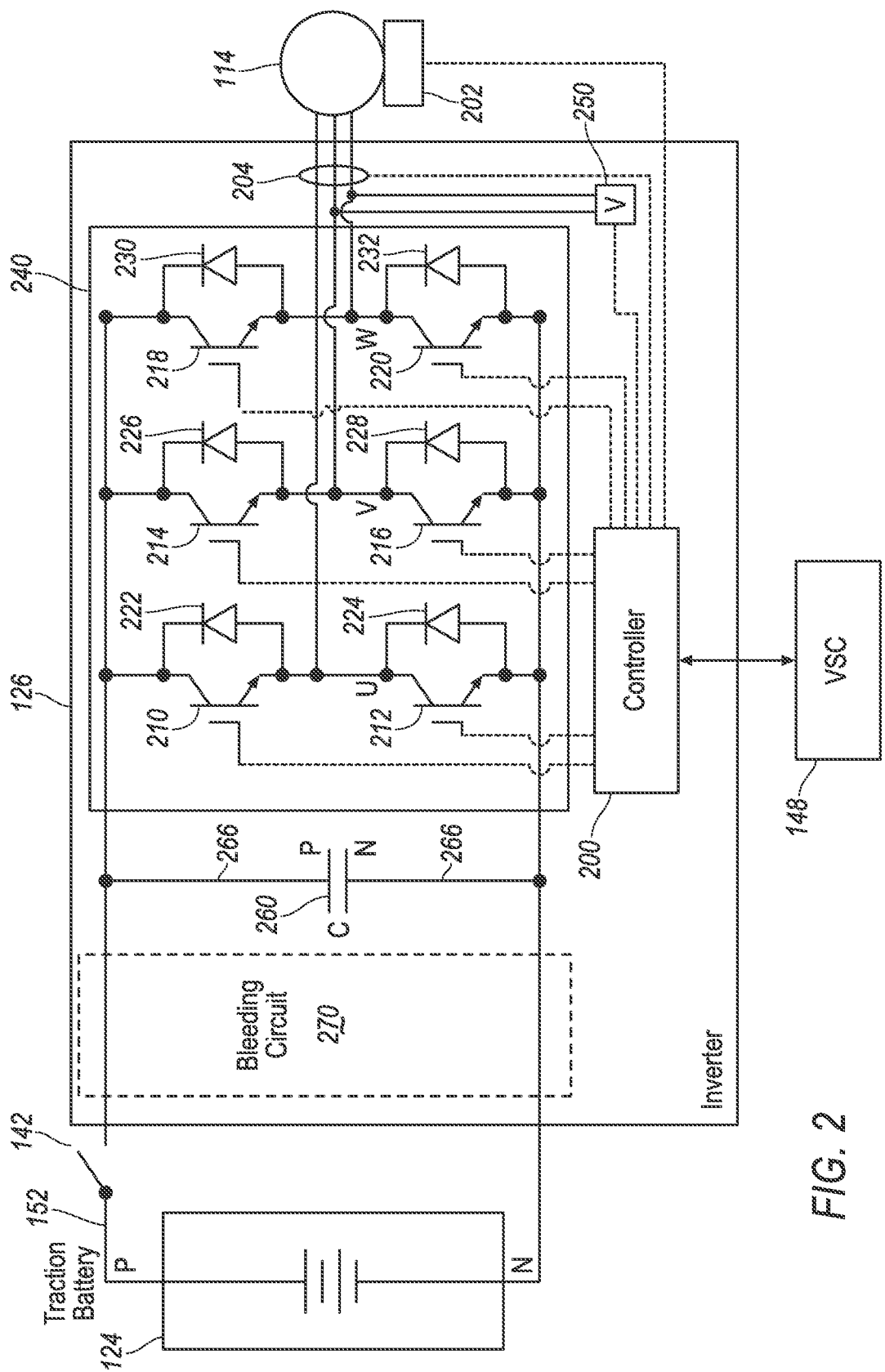
FIG. 2 is a diagram of a power inverter for an electric machine.

The electric machines 114 may be coupled to the power electronics module 126 via one or more conductors that are associated with each of the phase windings. FIG. 2 depicts a block diagram of a portion of an electric drive system for a vehicle. The vehicle 112 may include one or more power electronics controllers 200 configured to monitor and control the components of the power electronics module 126. The power electronics controllers 200 may be under a global control or coordination of the VSC 148. Further coordinated by the VSC 148 may be the main contactor 142 connected between the power electronics module 126 and the traction battery 124. As illustrated in the present example, the main contactor 142 may be connected on a positive terminal of a high-voltage rail (a.k.a. DC rail) 152. Under normal discharge and regenerative operating conditions, the main contactor 124 may be closed by the VSC 148 to connect the traction battery 124 to the rest of the circuit allowing the traction battery 124 to be discharged or charged.

The conductors may be part of a wiring harness between the electric machine 114 and the power electronics module 126. A three-phase electric machine 114 may have three conductors coupled to the power electronics module 126. The power electronics module 126 may be configured to switch positive and negative terminals of the high-voltage rail 152 to phase terminals of the electric machines 114. The power electronics module 126 may be controlled to provide a pulse-width modulated (PWM) voltage and sinusoidal current signals to the electric machine 114. The frequency of the signals may be proportional to the rotational speed of the electric machine 114. The controller 200 may be configured to adjust the voltage and current output of the power electronics module 126 at a predetermined switching frequency. The switching frequency may be the rate at which the states of switching devices within the power electronics module 126 are changed.

The power electronics module 126 may interface with a position/speed feedback device 202 that is coupled to the rotor of the electric machine 114. For example, the position/speed feedback device 202 may be a resolver or an encoder. The position/speed feedback device 202 may provide signals indicative of a position and/or speed of the rotor of the electric machine 114. The power electronics 126 may include a power electronics controller 200 that interfaces to the speed feedback device 202 and processes signals from the speed feedback device 202. The power electronics controller 200 may be programmed to utilize the speed and position feedback to control the power electronics module 126 to operate the electric machine 114.

The traction inverter or power electronics module 126 may include power switching circuitry 240 that includes a plurality of switching devices 210, 212, 214, 216, 218, 220. The switching devices 210, 212, 214, 216, 218, 220 may be Insulated Gate Bipolar Transistors (IGBT), Metal Oxide Semiconductor Field Effect Transistors (MOSFET), or other solid-state switching devices. The switching devices 210, 212, 214, 216, 218, 220 may be configured to selectively couple a positive terminal and a negative terminal of the high-voltage rail 152 to each phase terminal or leg (e.g., labeled U, V, W) of the electric machine 114. The power electronics 126 may be configured to provide a U-phase voltage, a V-phase voltage and a W-phase voltage to the electric machine 114. Each of the switching devices 210, 212, 214, 216, 218, 220 within the power switching circuitry 240 may have an associated diode 222, 224, 226, 228 230, 232 connected in parallel to provide a path for inductive current when the switching device is in a non-conducting state. Each of the switching devices 210, 212, 214, 216, 218, 220 may have a control terminal for controlling operation of the associated switching device. The control terminals may be electrically coupled to the power electronics controller 200. The power electronics controller 200 may include associated circuitry to drive and monitor the control terminals. For example, the control terminals may be coupled to the gate input of the solid-state switching devices.

A phase leg of the inverter 126 may include switching devices and circuitry configured to selectively connect a phase terminal of the electric machine 114 to each terminal of the high-voltage rail 152. A first switching device 210 may selectively couple the HV-rail positive terminal to a first phase terminal (e.g., U) of the electric machine 114. A first diode 222 may be coupled in parallel to the first switching device 210. A second switching device 212 may selectively couple the HV-rail negative terminal to the first phase terminal (e.g., U) of the electric machine 114. A second diode 224 may be coupled in parallel to the second switching device 212. A first inverter phase leg may include the first switching device 210, the first diode 222, the second switching device 212, and the second diode 224.

A third switching device 214 may selectively couple the HV-rail positive terminal to a second phase terminal (e.g., V) of the electric machine 114. A third diode 226 may be coupled in parallel to the third switching device 214. A fourth switching device 216 may selectively couple the HV-rail negative terminal to the second phase terminal (e.g., V) of the electric machine 114. A fourth diode 228 may be coupled in parallel to the fourth switching device 216. A second inverter phase leg may include the third switching device 214, the third diode 226, the fourth switching device 216, and the fourth diode 228.

A fifth switching device 218 may selectively couple the HV-rail positive terminal to a third phase terminal (e.g., W) of the electric machine 114. A fifth diode 230 may be coupled in parallel to the fifth switching device 218. A sixth switching device 220 may selectively couple the HV-rail negative terminal to the third phase terminal (e.g., W) of the electric machine 114. A sixth diode 232 may be coupled in parallel to the sixth switching device 220. A third inverter phase leg may include the fifth switching device 218, the fifth diode 230, the sixth switching device 220, and the sixth diode 232.

The power switching devices 210, 212, 214, 216, 218, 220 may include two terminals that handle the high-power current through the power switching device. For example, an IGBT includes a collector (C) terminal and an emitter (E) terminal and a MOSFET includes a drain terminal (D) and a source (S) terminal. The power switching devices 210, 212, 214, 216, 218, 220 may further include one or more control inputs. For example, the power switching devices 210, 212, 214, 216, 218, 220 may include a gate terminal (G) and a Kelvin source/emitter (K) terminal. The G and K terminals may comprise a gate loop to control the power switching device.

The traction inverter 126 may be configured to flow a rated current and have an associated power rating. Some applications may demand higher power and/or current ratings for proper operation of the electric machine 114. The power switching circuitry 240 may be designed to include power switching devices 210, 212, 214, 216, 218, 220 that can handle the desired power/current rating. The desired power/current rating may also be achieved by using power switching devices that are electrically coupled in parallel. Power switching devices may be electrically coupled in parallel and controlled with a common control signal so that each power switching device flows a portion of the total current flowing to/from the load.

The power electronics controller 200 may be programmed to operate the switching devices 210, 212, 214, 216, 218, 220 to control the voltage and current applied to the phase windings of the electric machine 114. The power electronics controller 200 may operate the switching devices 210, 212, 214, 216, 218, 220 so that each phase terminal is coupled to only one of the HV-rail positive terminal or the HV-rail negative terminal at a particular time.

Various motor control algorithms and strategies are available to be implemented in the power electronics controller 200. The power electronics module 126 may also include current sensors 204. The current sensors 204 may be inductive or Hall-effect devices configured to generate a signal indicative of the current passing through the associated circuit. In some configurations, two current sensors 204 may be utilized and the third phase current may be calculated from the two measured currents. The controller 200 may sample the current sensors 204 at a predetermined sampling rate. Measured values of the phase currents of the electric machine 114 may be stored in controller memory for later computations.

The power electronics module 126 may include one or more voltage sensors. The voltage sensors may be configured to measure an input voltage to the power electronics module 126 and/or one or more of the output voltages of the power electronics module 126. The power electronics module 126 may include a line voltage sensor 250 that is configured to measure a line voltage across the V and W phase outputs. The voltage may be a voltage difference between the V-phase voltage and the W-phase voltage. The voltage sensors may be resistive networks and include isolation elements to separate high-voltage levels from the low-voltage system. In addition, the power electronics module 126 may include associated circuitry for scaling and filtering the signals from the current sensors 204 and the voltage sensors. In some configurations, each phase leg of the inverter may have corresponding voltage and current sensors.

Under normal/discharge operating conditions, the power electronics controller 200 controls operation of the electric machine 114. For example, in response to torque and/or speed setpoints, the power electronics controller 200 may operate the switching devices 210, 212, 214, 216, 218, 220 to control the torque and speed of the electric machine 114 to achieve the setpoints. The torque and/or speed setpoints may be processed to generate a desired switching pattern for the switching devices 210, 212, 214, 216, 218, 220. The control terminals of the switching devices 210, 212, 214, 216, 218, 220 may be driven with PWM signals to control the torque and speed of the electric machine 114. The power electronics controller 200 may implement various well-known control strategies to control the electric machine 114 using the switching devices such as vector control and/or six-step control. During discharge operating conditions, the switching devices 210, 212, 214, 216, 218, 220 are actively controlled to achieve a desired current through each phase of the electric machine 114.

Under regenerative/charge operating conditions (e.g. regenerative mode), the power electronics controller 200 may control the power electronics module 126 to accommodate power generated by the electric machine 114. For example, the power electronics controller 200 may operate the switching devices 210, 212, 214, 216, 218, 220 to convert AC power generated by the electric machine 114 to DC current to charge the traction battery 124 via the high-voltage rail 152. The power electronics controller 200 may implement various well-known control strategies to perform the regenerative operation.

The power electronics module 126 may also include one or more bus capacitors 260 that are coupled across the positive and negative terminals of the high-voltage rail 152 via a high-voltage bus (a.k.a. DC bus) 266. As illustrated in FIG. 2, a positive terminal of the high-voltage bus 266 connects the positive terminal of the high-voltage rail 152 to a first terminal of the bus capacitor 260, and a negative terminal of the high-voltage bus 266 connects the negative terminal of the high-voltage rail 152 to a second terminal of the bus capacitor 260. Here, since the high-voltage bus 266 is directly connected to the high-voltage rail 152, voltage on the high-voltage bus 266 may be substantially the same as voltage on the high-voltage bus 152. The bus capacitors 260 may smooth the voltage of the high-voltage bus 266 as well as the voltage of the high-voltage rail 152. As illustrated in FIG. 2, the high-voltage bus 266 and the bus capacitor 260 may be integrated with the power electronics module 126. Alternatively, the high-voltage bus 266 and the bus capacitor 260 may be independent components outside with the power electronics module 126. A bleeding circuit (a.k.a. dissipation circuit) 270 may be connected in parallel with the capacitor 260 between the positive and negative terminals of the high-voltage rail 152 configured to discharge a load dump on the high-voltage bus 266. Alternatively, the bleeding circuit 270 may be directly connected to the high-voltage bus 266 instead of being connected to the high-voltage rail 152 depending on specific design need. Similar to the high-voltage bus 266, The bleeding circuit 270 may be implemented as a part of the power electronics module 126 or alternatively as a individual component outside the power electronics module 126. For instance, a load dump may include a fault condition when the main contactor 142 is open while the electric machine 114 is in a regenerative mode. Under such condition, since the traction battery 124 is disconnected from the inverter 126, the electric power generated by the electric machine 114 may be dumped into the capacitor 260 and cause the voltage of the high-voltage bus 266 to rise rapidly. In severe cases, the rapid rising voltage on the high-voltage bus 266 may surpass the breakdown voltage of the switching devices 210, 212, 214, 216, 218, 220 and the capacitor 260 without a protection mechanism. The bleeding circuit 270 may be used as a protection mechanism to discharge the high-voltage bus 266 in the load dump situation.

Figure 3:
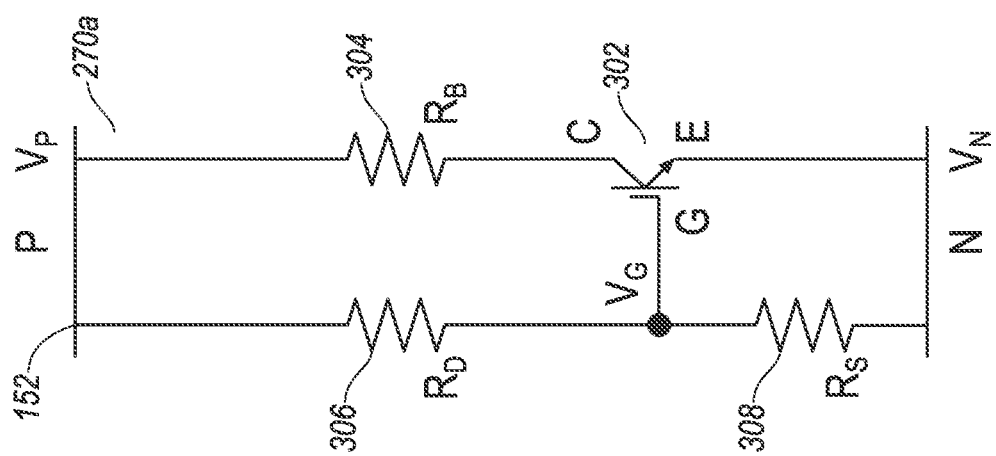
FIG. 3 is a diagram of a first bleeding circuit for the inverter.

FIG. 3 depicts a bleeding circuit of one embodiment of the present disclosure. The bleeding circuit 270a in the present example may include a switching device (a.k.a. bleeding switch) 302. The bleeding switch 302 may be an IGBT, a MOSFET, or another solid-state switching device. For the simplicity of the illustration, an IGBT having a gate terminal, a collector terminal and an emitter terminal will be used to describe the bleeding switch 302 in the present example. As illustrated, the emitter terminal of the bleeding switch 302 may be connected to the negative terminal of the high-voltage rail 152. A bleeding resistor (a.k.a. dissipation resistor) 304 may be connected between the collector terminal of the bleeding switch 302 and the positive terminal of the high-voltage rail 152. The gate terminal of the bleeding switch 302 is connected to the positive terminal of the high-voltage rail 152 via a discharge resistor 306, and to the negative terminal of the high-voltage rail 152 via a sensing resistor 308 respectively.

During normal operation, the high-voltage rail 152 may be discharged through the discharge resistor 306 and the sensing resister 308 connected in series. The resistance of the sensing resistor 308 may be selected significantly smaller than the resistance of the discharge resistor 306. Therefore, the voltage-drop across the sensing resistor 308 may be small and not enough to switch on the bleeding switch 302 via the gate terminal. When the bleeding switch 302 is OFF, there is no current flowing through the bleeding resistor 304 and therefore no additional power loss is generated during normal operation. When the load dump occurs, the voltage across the high-voltage bus 266 and high-voltage rail 152 may increase rapidly, eventually causing the voltage-drop across the sensing resistor 308 to surpass the threshold voltage of the bleeding switch 302. When the bleeding switch 302 turns ON, power across the high-voltage rail 152 and high-voltage bus 266 may be discharged via the bleeding switch 304. The value of the bleeding resistor 304 may be smaller than the discharge resistor, allowing a quick discharge of the high-voltage bus 266. As the voltage across the DC bus 266 reduces, the voltage-drop across the sensing resistor 308 may eventually decrease below the threshold voltage of the bleeding switch and the circuit 270a returns to normal operation.

The following is an example to determine a value for each component of the bleeding circuit 270a. The high-voltage bus 266 may have a maximum operating DC voltage of 400V, while the inverter 126 may have a breakdown voltage of 800V. Therefore, the bleeding circuit 270a needs to be activated when the voltage on the high-voltage bus 266 is between 400V and 800V. In the present example, the high-voltage bus threshold voltage may be set to 500V. The discharging resistor 306 may be selected to meet a discharge regulatory requirement. For the 400V DC bus configuration of the present example, the discharging resistor may have a value of $R_D$=40 kΩ. For instance, a 5% accuracy resistor may be used with a minimum, typical, and maximum values at 36.1 kΩ, 38 kΩ and 39.9 kΩ respectively. The bleeding switch 302 may have a gate terminal threshold $V_{GE\_threshold}$ at around 0.7V (with a minimum and maximum value of 0.67V and 0.73V respectively). The sensing resistor 308 connected between the collector and gate of the bleeding switch 302 may be selected to meet the following conditions. When the voltage on the high-voltage bus 266 is below 500V, the sensing resistor needs 308 to keep the bleeding switch 302 in OFF state. Therefore, $$R_{S\_Max}/(R_{S\_Max}+R_{D\_min}) \times 500\ V < V_{GE\_Threshold\_Min} \quad (1)$$

Based on formula (1), the maximum value of the sensing resistor 308 may be calculated as $$R_{S\_Max} < 48.44\ \Omega \quad (2)$$

When the voltage of the high-voltage bus 266 is above 800V, the sensing resistor 308 needs to keep the bleeding switch 302 in ON state. Therefore, $$R_{S\_Min}/(R_{S\_Min}+R_{D\_Max}) \times 800\ V > V_{GE\_Threshold\_Max} \quad (3)$$

Based on formula (2), the minimum value of the sensing resistor 308 may be calculated as $$R_{S\_min} > 36.44\ \Omega \quad (4)$$

Based on the above calculations, a value range of the sensing resistor 308 may be determined. In the present example, the sensing resistor 308 may be selected to have a 5% accuracy with the minimum, typical, and maximum values of 42.75Ω, 45Ω, and 47.25Ω which meet the above range requirement. The value of the bleeding resistor 304 may be application dependent and selected to be small enough to quickly bleed the energy being injected into the high-voltage bus 266. As an example, the value of the bleeding resistor 304 may be around 80-100Ω.

Figure 4:
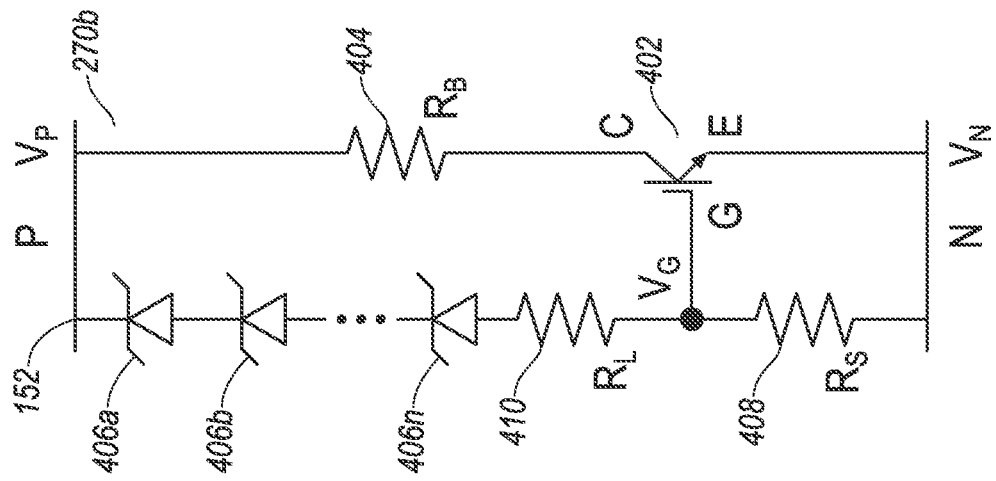
FIG. 4 is a diagram of a second bleeding circuit for the inverter.

FIG. 4 depicts a bleeding circuit of another embodiment of the present disclosure. Compared with the example illustrated in FIG. 3, the bleeder circuit 270b in the present example uses multiple Zener diodes 406 and a limiting resistor 410 connected in series in lieu of the discharging resistor 306. As illustrated, the bleeding switch 402 may be an IGBT having a gate terminal, a collector terminal and an emitter terminal. The emitter terminal of the bleeding switch 402 may be connected to the negative terminal of the high-voltage rail 152. A bleeding resistor (a.k.a. dissipation resistor) 404 may be connected between the collector terminal of the bleeding switch 402 and the positive terminal of the high-voltage rail 152. The gate terminal of the bleeding switch 402 is connected to the positive terminal of the high-voltage rail 152 via the limiting resistor 410 and at least one Zener diode 406 connected in series. The gate terminal of the bleeding switch 402 may be further connected to the negative terminal of the high-voltage rail 152 via a sensing resistor 408.

During normal operation, the Zener diodes 406 may block the DC voltage across the positive and negative terminals of the high-voltage bus 266 to prevent power loss. In this situation, there is no current passing through the limiting resistor 410 and the sensing resistor 408. The bleeding switch 402 may be in OFF state because the threshold voltage is not reached across the sensing resistor 408. When the load dump condition occurs, the voltage on the high-voltage bus 266 may increase rapidly. Once the voltage exceeds the breakdown voltage of the Zener diodes 406, current may flow through the Zener diodes 406, the limiting resistor 410 and the sensing resistor. The voltage-drop across the sensing resistor 308 may surpass the threshold voltage of the bleeding switch 302. When the bleeding switch 402 turns ON, power across the high-voltage bus 266 may be discharged via the bleeding switch 404. The value of the bleeding resistor 404 may be smaller than the discharge resistor, allowing a quick discharge of the high-voltage bus 266. As the voltage across the DC bus 266 reduces, the voltage-drop across the Zener diodes 406 may drop below the breakdown voltage and the Zener diodes 406 once again block the DC voltage. The voltage-drop across the sensing resistor 408 may decrease below the threshold voltage of the bleeding switch and the circuit 270b returns to normal operation.

The following is an example to determine a value for each components of the bleeding circuit 270b. The high-voltage bus 266 may have a maximum operating DC voltage of 400V, while the inverter 126 may have a breakdown voltage of 800V. Therefore, the bleeding circuit 270b needs to be activated when the voltage on the high-voltage bus 266 is between 400V and 800V. In the present example, the high-voltage bus threshold voltage may be set to 600V. A Zener diode 406 with 3 W power rating may be used. The number (i.e. n) of the Zener diodes 406 to form the diode chain may be application dependent. For instance, three Zener diodes 406 are used in the present example (i.e. n=3). Each Zener diode 406 may have a breakdown voltage (a.k.a. Zener voltage) ranges within 228V minimum, 240V typical, and 256V maximum. Similar to the example illustrated in FIG. 3, the bleeding switch 402 may have a gate terminal threshold $V_{GE\_threshold}$ at around 0.7V (with a minimum and maximum value of 0.67V and 0.73V respectively). The sensing resistor 408 and the limiting resistor are selected to limit the current flowing through the Zener diodes 406 using the following formulas:

$$((800\ V - V_{Zener\_Min} \times n) - V_{GE\_Threshold\_Min})/R_{L\_Min} < 3\ W/V_{Zener\_Max} \quad (5)$$

which gives $$R_{L\_Min} > 9.86\ \Omega \quad (6)$$

To make sure the bleeding switch 402 turns ON when the high-voltage bus 266 is 800V or above, $$(800\ V - V_{Zener\_Max} \times n) \times R_{S\_min}/(R_{S\_min}+R_{L\_max}) > V_{GE\_Threshold\_Max} \quad (7)$$

Therefore, $$R_{L\_Max} < 42.84 \times R_{S\_min} \quad (8)$$

Based on formulas (6) and (8) presented above, a general range of the sensing resistor 408 and the limiting resistor 410 may be calculated. In the present example, a 5% accuracy resistor with minimum, typical, and maximum values of 285Ω, 300Ω, 315Ω may be selected for the sensing resistor 408, and a 5% accuracy resistor with minimum, typical, and maximum values of 10.93 kΩ, 11.5 kΩ, 12.08 kΩ may be selected for the limiting resistor 410 to meet the requirement of formulas (6) and (8). The value of the bleeding resistor 404 may be application dependent and selected to be small enough to quickly bleed the energy being injected into the high-voltage bus 266. As an example, the value of the bleeding resistor 404 may be around 80-100Ω.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for dissipating power of an automotive electric drive system that includes a traction battery, and an inverter including a DC bus and a dissipation circuit between the traction battery and DC bus, wherein the dissipation circuit includes one or more Zener diodes, a plurality of resistors connected in series with said one or more Zener diodes between positive and negative terminals of the DC bus, and a dissipation resistor and switch connected in series between the positive and negative terminals, and wherein a control terminal voltage of the switch is defined by a voltage across one of the plurality of resistors, the method comprising:

responsive to the voltage across one of the plurality of resistors being less than a threshold value, deactivating the switch to prevent current flow from the positive terminal to the negative terminal through the dissipation resistor, and responsive to the voltage across one of the plurality of resistors exceeding the threshold value, activating the switch to permit current flow from the positive terminal to the negative terminal through the dissipation resistor.

2. The method of claim 1, wherein the automotive electric drive system further includes a contactor between the traction battery and the dissipation circuit and wherein the activating does not take place while the contactor is closed.

3. The method of claim 1, wherein the automotive electric drive system further includes a contactor between the traction battery and the dissipation circuit and wherein the activating only takes place while the contactor is open.

4. The method of claim 1, wherein the switch is an integrate gate bipolar transistor.

5. An automotive electric drive system comprising:
   a traction battery;
   an inverter;
   a DC bus between the traction battery and inverter; and
   a dissipation circuit, between the traction battery and DC bus, including one or more Zener diodes, a limiting resistor, and sensing resistor connected in series between positive and negative terminals of the DC bus and a dissipation resistor and switch connected in series between the positive and negative terminals, wherein the limiting resistor, a first end of the sensing resistor, and gate of the switch share a common terminal, and a second end of the sensing resistor is connected to the negative terminal of the DC bus, and wherein the switch is configured such that responsive to a voltage across the sensing resistor being less than a threshold value, the switch remains off to prevent current flow from the positive terminal to the negative terminal through the dissipation resistor, and responsive to the voltage across the sensing resistor exceeding the threshold value, the switch turns on to permit current flow from the positive terminal to the negative terminal through the dissipation resistor.

6. The automotive electric drive system of claim 5 further comprising a contactor between the traction battery and dissipation circuit, wherein the dissipation circuit is configured such that the switch remains off while the contactor is closed.

7. The automotive electric drive system of claim 5 further comprising a contactor between the traction battery and dissipation circuit, wherein the dissipation circuit is configured such that the switch is permitted to turn on while the contactor is open.

8. The automotive electric drive system of claim 5, wherein the limiting, sensing, and dissipation resistors have respective resistance values such that the dissipation circuit prevents a voltage of the DC bus from exceeding a predetermined value during load dump conditions.

9. The automotive electric drive system of claim 5 further comprising an electric machine, wherein the inverter is configured to transfer power between the DC bus and the electric machine.

10. The automotive electric drive system of claim 5, wherein the switch is an integrate gate bipolar transistor.

* * * * *